United States Patent
Bouiller et al.

(10) Patent No.: US 7,040,082 B2
(45) Date of Patent: May 9, 2006

(54) ASSISTANCE AND EMERGENCY DRIVE FOR ELECTRICALLY-DRIVEN ACCESSORIES

(75) Inventors: Philippe Bouiller, Samoreau (FR); Michel Franchet, Pouilly le Fort (FR); Jean-Pierre Ruis, Chatelet en Brie (FR)

(73) Assignee: Snecma Moteurs, Paris (FR)

( * ) Notice: Subject to any disclaimer, the term of this patent is extended or adjusted under 35 U.S.C. 154(b) by 88 days.

(21) Appl. No.: 10/617,656

(22) Filed: Jul. 14, 2003

(65) Prior Publication Data

US 2004/0011018 A1 Jan. 22, 2004

(30) Foreign Application Priority Data

Jul. 17, 2002 (FR) .................................. 02 09028

(51) Int. Cl.
 *F02C 7/32* (2006.01)

(52) U.S. Cl. ...................... 60/39.183; 60/39.08; 60/803
(58) Field of Classification Search ................. 60/802, 60/803, 39.08, 39.183
See application file for complete search history.

(56) References Cited

U.S. PATENT DOCUMENTS

| | | | | |
|---|---|---|---|---|
| 2,939,017 A | * | 5/1960 | Teague, Jr. et al. | 60/39.183 |
| 2,949,731 A | * | 8/1960 | Hambling | 60/39.183 |
| 3,274,757 A | * | 9/1966 | Wapler | 96/359 |
| 4,729,218 A | * | 3/1988 | Haselbauer et al. | 60/802 |
| 5,285,626 A | * | 2/1994 | Leeson | 60/39.183 |
| 5,577,385 A | | 11/1996 | Kapich | |
| 5,899,085 A | | 5/1999 | Williams | |
| 6,145,314 A | | 11/2000 | Woollenweber et al. | |

FOREIGN PATENT DOCUMENTS

EP  0 694 472 A1  1/1996

* cited by examiner

*Primary Examiner*—Ted Kim
(74) *Attorney, Agent, or Firm*—Oblon, Spivak, McClelland, Maier & Neustadt, P.C.

(57) ABSTRACT

The invention relates to a system for driving an accessory, such as a fuel pump or an oil pump in a turboengine, said system comprising an electric motor and further comprising an air turbine associated with said electric motor. Said air turbine is suitable for being fed with a flow of air taken from a compressor of said turboengine and contributing to driving the accessory. The system also includes a valve for controlling the flow of air taken from the compressor, which valve is in the closed position while the turboengine is starting.

21 Claims, 6 Drawing Sheets

ASSISTANCE AND EMERGENCY DRIVE FOR ELECTRICALLY-DRIVEN ACCESSORIES

The invention relates to operating safety for electrically-driven accessories of a turboengine, in particular an aeroengine.

BACKGROUND OF THE INVENTION

Thrust/weight ratio has always been the major target of engine manufacturers seeking to improve military jets. Increasing compression ratio, increasing turbine inlet temperatures, and improving efficiency have led to a continuous reduction in engine size.

Conventionally, the power takeoff needed for driving accessories of the jet, such as the fuel pump, the oil pump, and the electricity generator, comprises a radial shaft driven by the compressor shaft via angle takeoff means, and in turn driving the accessories which are situated in a housing disposed to one side of the engine. The power takeoff and the accessory housing have had difficulty in keeping up with improvements in engines, and they now represent a very large fraction of the total mass of an engine, particularly of a small engine, particularly when the housing also contains a starter and an alternator.

The size of the accessory housing increases the frontal area of the engine.

However the use of small engines on trainer aircraft and also on attack or observation drones or on cruise missiles requires engine manufacturers to improve the furtiveness of such engines and thus to decrease their frontal area.

The mass and the frontal area of engines can be reduced by integrating a starter/generator in the jet and by driving the accessories using electric motors powered by the generator.

Under such circumstances, the mechanical power takeoff and the accessory housing can be made smaller or can be omitted.

The use of electric motors for driving accessories, such as fuel pumps, lubricating oil pumps, and hydraulic pumps, presents the advantage of making the accessories easier to control and of enabling them to be placed anywhere in the airframe or the engine mounting pylon in locations that make them more accessible and easier to replace, while nevertheless reducing their vulnerability to possible enemy fire.

The only engine/accessory interface then becomes an electrical transmission. It constitutes an electricity network which conveys energy from the auxiliary power unit to the starter and to the electric motor that drives the fuel pump while starting the engine, after which, once the jet is capable of running on its own, it is the integral starter/generator which supplies electricity to the electric motors driving the accessories, in particular the motor driving the fuel pump.

However, in spite of the high degree of reliability of present-day electrical systems, it is always possible for an electrical breakdown to occur in flight, either on the electricity generator, or on the electric motor driving the fuel pump. That will cause the engine to go out and can lead to loss of the airplane or other aircraft if it has only one engine.

OBJECT AND SUMMARY OF THE INVENTION

The object of the invention is to remedy this severe problem, by associating the electric motor for driving the accessory with a backup system capable on its own of ensuring that the accessory can continue to function once the turboengine has started and in the event of a failure in the supply of electrical power to the electric motor or a failure of the electric motor.

The invention thus relates to a system for driving a fuel pump or an oil pump in a turboengine, said system comprising an electric motor presenting a stator and a rotor.

According to the invention, the drive system further comprises an air turbine presenting a casing and a rotary assembly; said air turbine being suitable for being fed by a flow of air taken from a compressor of said turboengine in order to contribute to driving said accessory. The air turbine is preferably coaxial with said electric motor. Most advantageously, the stator of said electric motor is integrated in the casing of said air turbine and the rotor of said electric motor is integrated in the rotary assembly.

The term "integrate" is used to mean that the stator of the electric motor is carried by the casing and the rotor is mounted on the rotary assembly, coaxially with the axis of rotation of the air turbine and without having bearings that are specific to the electric motor, thereby making the drive system compact and lightweight.

According to another characteristic of the invention, the drive system further comprises a control valve for controlling the flow of air taken from the compressor, which control valve is in a closed position while the turboengine is starting and in an open position once it has started.

This disposition enables the air turbine to be fed with air while the aircraft fitted therewith is in flight, thus enabling the electric motor to be off-loaded at least in part, and because of the reduced size and electricity demand of the electric motor, also reducing the power it consumes thus making it available for other requirements.

Advantageously, the flow of air taken from the compressor is sufficient to enable the pump to be operated by the air turbine in the absence of electrical power supply or in the event of said electric motor failing, and to continue flying.

The rotor of the electric motor is mounted on a wall of the rotary assembly and the stator is mounted on a wall of the casing.

Preferably, the rotary assembly includes a shaft mechanically coupled to the accessory and supported by bearings interposed between said shaft and the casing.

In a first embodiment, the air turbine is of the axial-centripetal type, and the rotary assembly includes a wheel at the free end of the shaft, axial-centripetal blades extending from the periphery of the wheel.

In a first variant of the first embodiment, the air stream passages between the blades are outwardly defined by a wall secured to the ends of the blades and axially extended in the air flow direction by a cylindrical sleeve around which the rotor of the electric motor is mounted.

In a second variant of the first embodiment, the wheel presents a cylindrical sleeve at the radially outer ends of the blades, which sleeve extends axially in the direction opposite to the air flow direction, and is disposed in an axial housing formed in the casing around the bearings, and the rotor of the electric motor is mounted inside said sleeve.

In a second embodiment of the invention, the air turbine is of the axial type and comprises at least one ring of stationary blades extending radially inwards from the casing, and a ring of moving blades extending radially outwards from a drum secured to the shaft, the rotor of the electric motor being mounted inside said drum and the stator being mounted around a cylindrical sleeve connected to the casing by structural arms.

In a third embodiment of the invention, the air turbine is of the axial type and has a ring of nozzle blades and a ring of moving blades provided at the periphery of a wheel which extends radially from a middle zone of the shaft, said shaft being supported at each of its ends by a respective bearing, the air flow stream being defined downstream from the ring of moving blades by two shrouds forming a support structure for one of the bearings, and the rotor of the electric motor is mounted on a face of said wheel, the airgap of said electric motor lying in a radial plane.

In an advantageous disposition of the third embodiment of the invention, a second electric motor is provided whose rotor is mounted on the other face of the wheel.

BRIEF DESCRIPTION OF THE DRAWINGS

Other advantages and characteristics of the invention appear on reading the following description made with by way of example and with reference to the accompanying drawings, in which:

FIG. 7 shows a second embodiment of the drive system of the invention;

FIG. 8 shows a third embodiment of the drive system of the invention; and

MORE DETAILED DESCRIPTION

Figure 1:
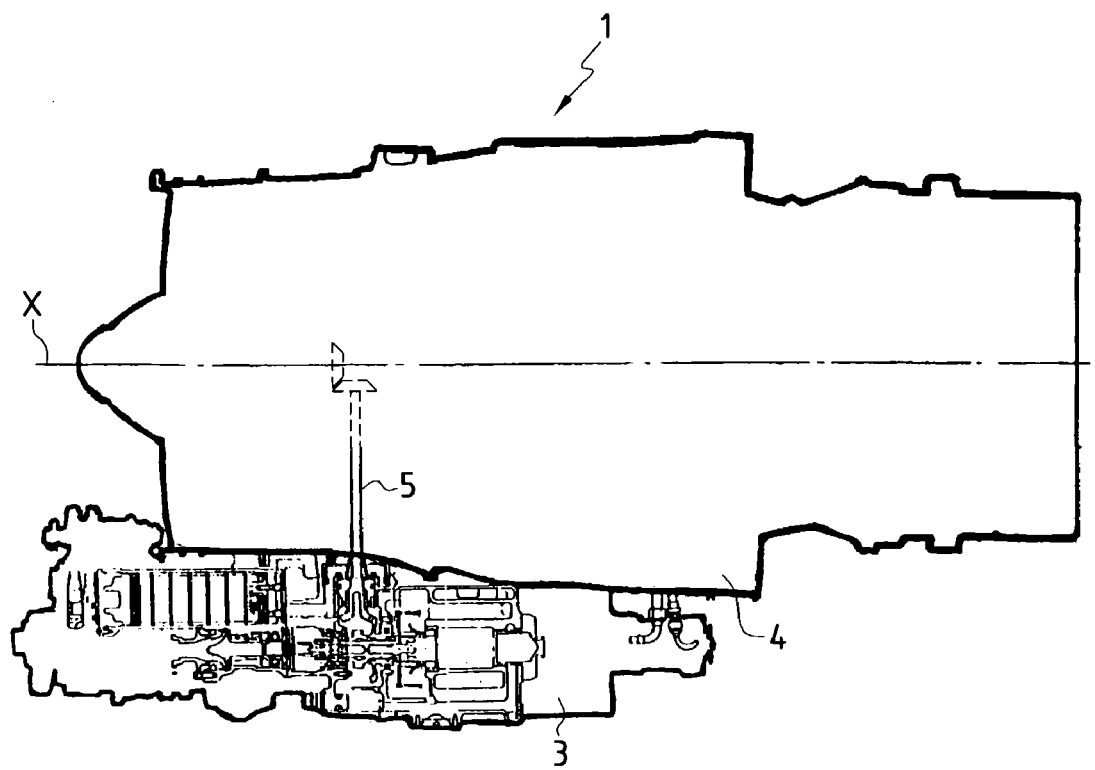
FIG. 1 is a side view of a conventional turboengine having a housing containing accessories driven by a takeoff shaft.
Figure 3:
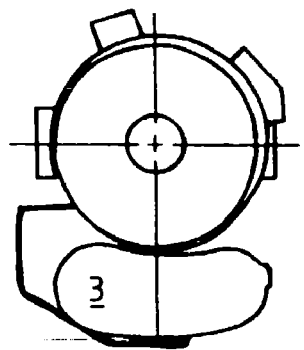
FIG. 3 is a front view of the FIG. 2 turboengine.
Figure 2:
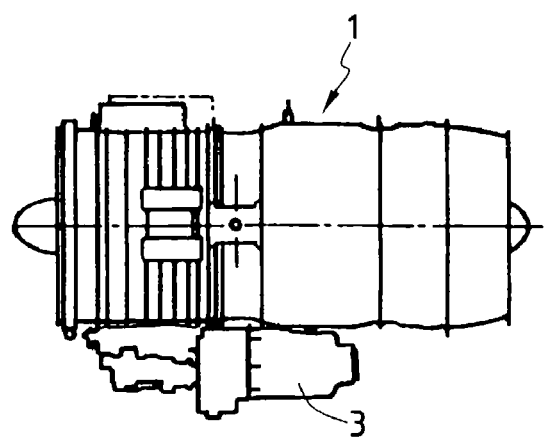
FIG. 2 is a side view of another conventional turboengine having a housing containing accessories driven by a takeoff shaft.

FIG. 1 to 3 shows a turboengine 1 of axis X which has an accessory housing 3 disposed beneath the casing 4 of the turboengine 1. The accessories placed in the housing 3 are driven by a radial takeoff shaft 5 and angle gearing. The takeoff shaft 5 is driven by the shaft on axis X which connects the turbine of the turboengine 1 to the compressor. The accessories contained in the housing 3 essentially comprise an electricity generator, a fuel pump, an oil pump, hydraulic pumps, and a starter driven electrically or by air, and they are all driven mechanically by mechanical drive systems. As shown in FIGS. 2 and 3, the housing 3 is of large volume and considerably increases the frontal area of the turboengine 1, particularly when it is constituted by a low power single-shaft turbojet. The mass of the housing and of the accessories may be as much as 20% of the total mass of the turboengine 1 in low-power turboengines.

In order to reduce the mass and the frontal area of such a turbojet, it is advantageous to drive the accessories by means of electric motors powered by a generator/starter integrated in the turboengine 1, i.e. by a generator/starter on the axis X having its rotor secured to the rotor of the turboengine 1. The accessories can then be placed anywhere in the airframe or the pylon supporting the turboengine 1, and using an electric motor also presents the advantage of making it easier to control the accessory. The housing 3 and the takeoff shaft 5 can then be eliminated.

The major drawback of driving an accessory by means of an electric motor lies in the accessory no longer being driven, in the event of said electric motor failing or in the event of the electrical power supply to the motor failing.

If the accessory is the fuel pump, then the combustion chamber is no longer fed with fuel, which means that the combustion chamber will go out.

The object of the invention is to provide a system for driving an accessory, and in particular the fuel pump, which makes it possible to ensure that the accessory continues to operate even in the event of the electric motor failing or of its electrical power supply failing.

Figure 4A:
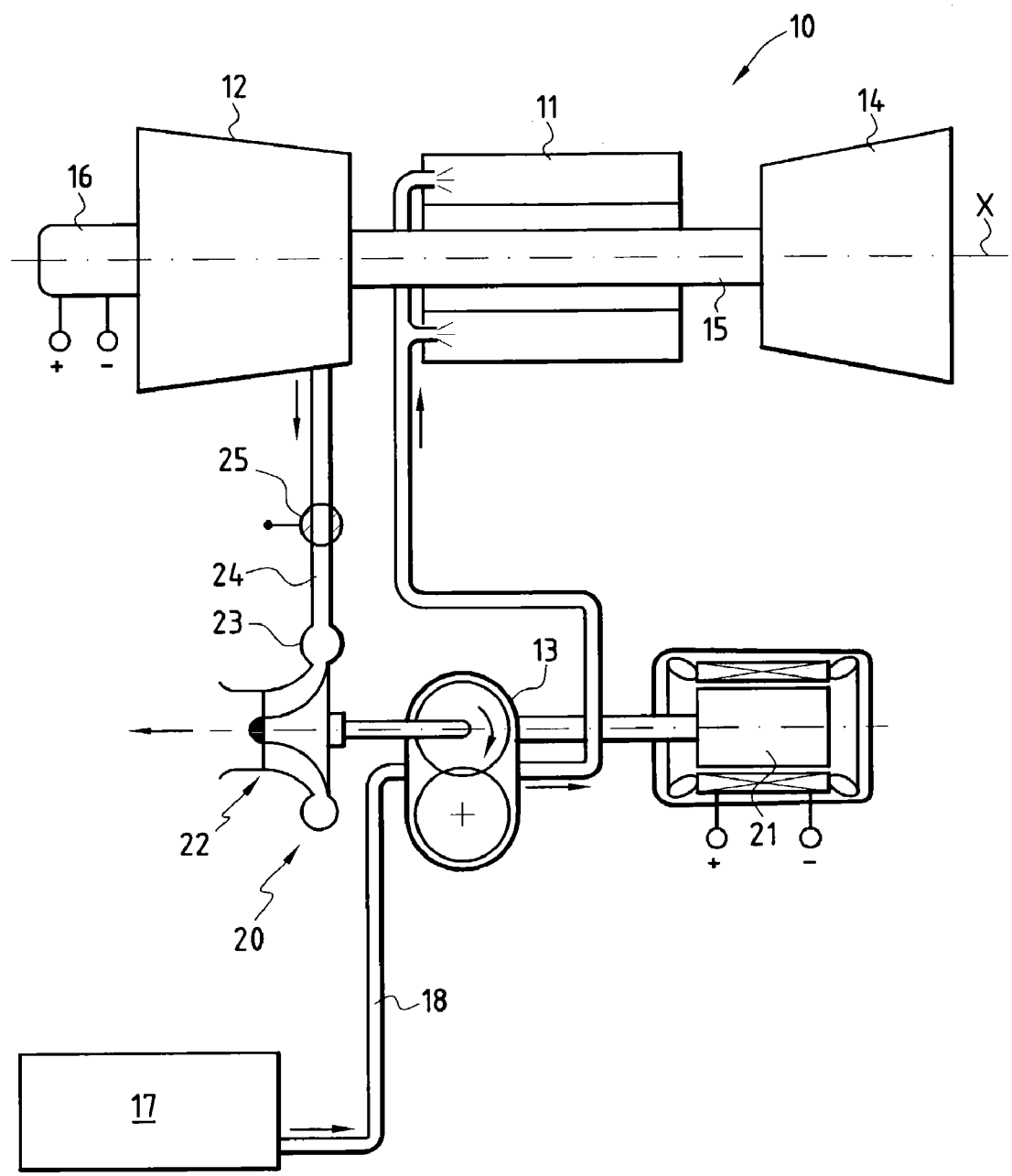
FIG. 4A is a block diagram showing an "all-electric" type turbo engine having a system in accordance with the invention for driving the fuel pump.
Figure 4B:
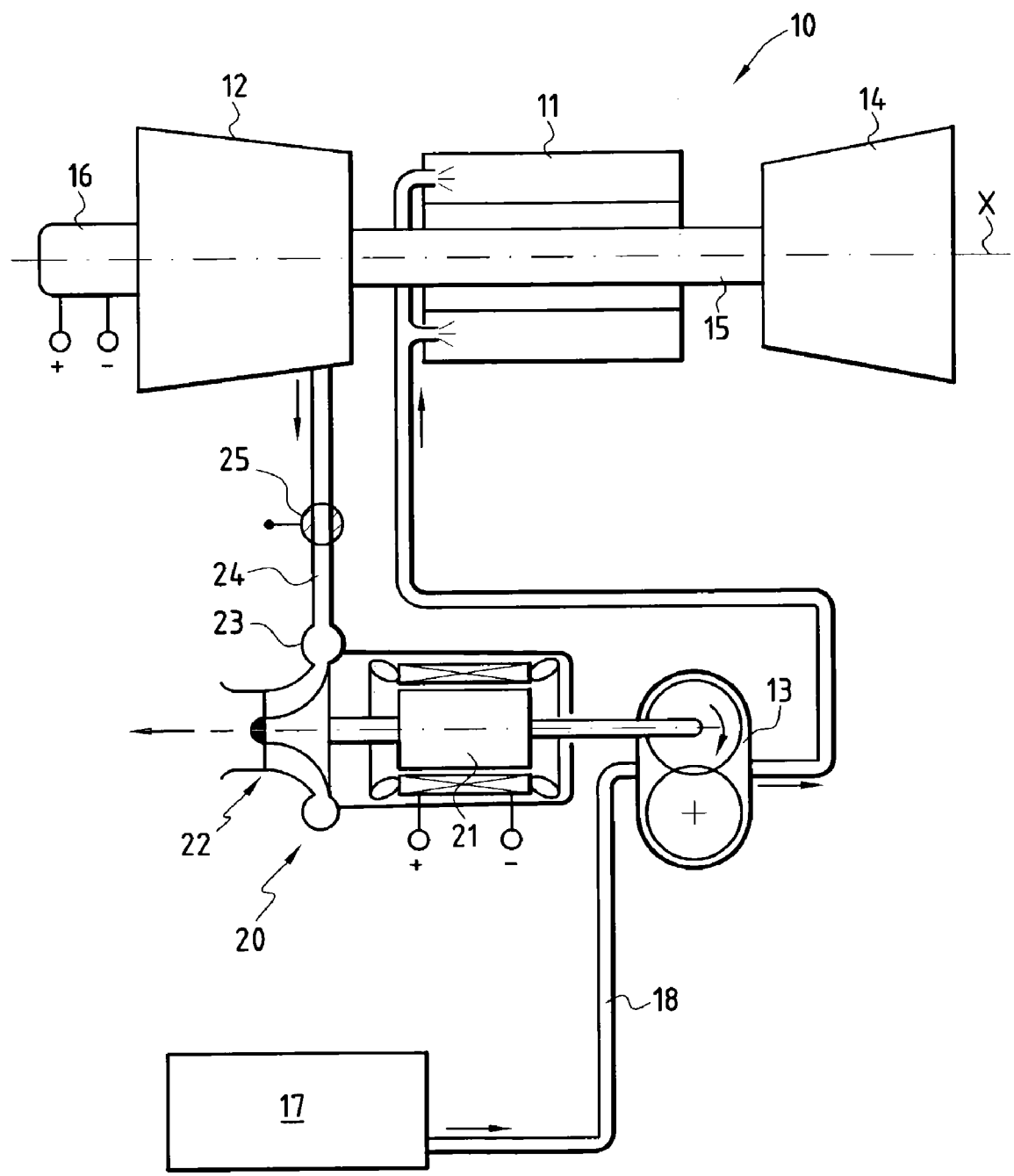
FIG. 4B, similar to FIG. 4A, shows a variant embodiment of the drive system of the invention.

FIGS. 4A and 4B are diagrams showing an "all-electric" turboengine 10 of axis X which comprises a combustion chamber 11 fed with air by a compressor 12 and with fuel by a fuel pump 13. The hot gas coming from the combustion chamber 11 drives a turbine 14 connected to the compressor 12 by a shaft 15. The turboengine 10 is also fitted with an integrated starter/generator 16 on the axis X and located in a cold zone of the compressor 12. Reference 17 designates the fuel tank connected to the pump 13 by a pipe 18.

The fuel pump 13 is driven by a drive system 20 comprising both an electric motor 21 and an air turbine 22 which is preferably on the same axis as the electric motor 21 and which has an inlet tube 23 connected to the compressor 12 via an air takeoff pipe 24 with a two-port control valve 25 located therein under the control of the full-authority digital engine control (Fadec) of the turboengine 10 (not shown in the drawing).

The drive system 20 operates as described below:

While the turboengine 10 is being started, the control valve 25 is in the closed position. The starter/generator 16 is in its starter configuration and is powered by electricity from an auxiliary power unit (not shown in the drawing). The electric motor 21 is also powered by the auxiliary power unit during starting. The turboengine rotor 10 starts to rotate at lighting speed, and the combustion chamber 11 is fed with air by the compressor 12. Fuel is then injected into the combustion chamber 11 by means of the fuel pump 13 driven by the electric motor 21 under the control of the Fadec. Once the engine has lighted, the starter/generator 16 is put into its electricity generator configuration. Once idling speed is reached, the generator 16 supplies enough electricity to power the electric motor 21 for driving the fuel pump 13 and the electric motors for driving the other accessories, thereby enabling the turboengine 10 to be run on its own without any help from the auxiliary power unit.

The valve 25 for controlling the flow of air taken off from the compressor 12 is then opened by the Fadec so that the air turbine 22 tops up mechanical drive of the fuel pump 13 under all flight conditions.

The air turbine 22 is dimensioned in such a manner that in the event of the generator 16 or the motor 21 failing, it is capable on its own of supplying sufficient emergency power to drive the fuel pump 13 so as to enable the airplane or aircraft fitted with the turboengine 10 to continue flying or return to base, perhaps at reduced speed.

FIGS. 5 to 9 show embodiments of an electro-pneumatic drive device 20 for driving a gear pump 13.

Figure 5:
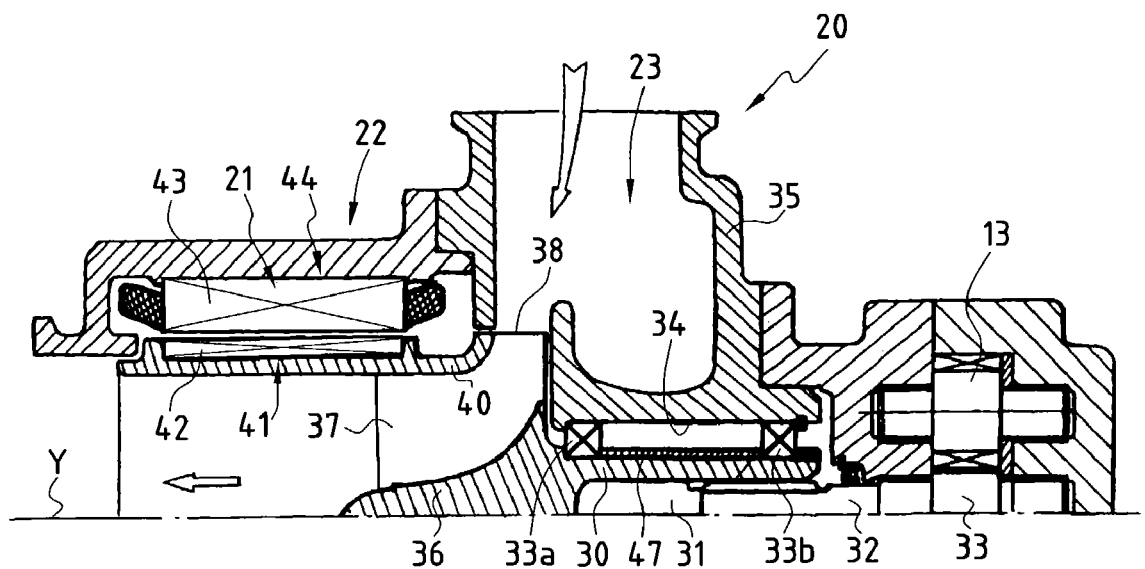
FIG. 5 shows a first embodiment of the drive system of the invention.
Figure 6:
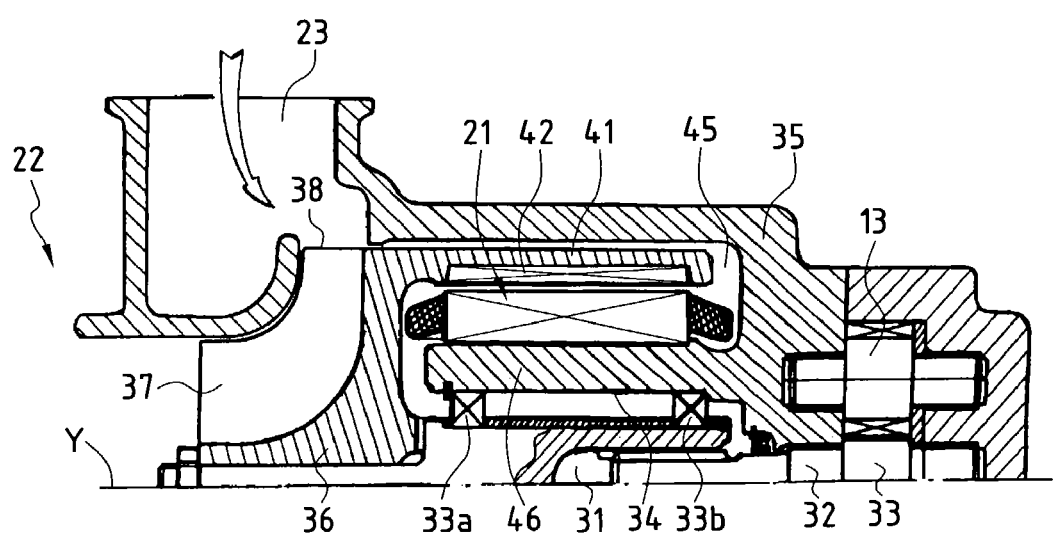
FIG. 6 shows a variant of the first embodiment of the invention.

In a first embodiment shown in FIGS. 5 and 6, the air turbine 22 is of the axial-centripetal type and comprises a shaft 30 of axis Y having a fluted bore 31 at one of its ends enabling it to be coupled with the drive shaft 32 of one of the gearwheels 33 of the gear pump 13. The shaft 30 is supported by two bearings 33a and 33b in a bore 34 of the casing 35 of the air turbine 22. At its end opposite from the gear pump 13, the shaft 30 has a wheel 36 of aerodynamic profile with axial-centripetal shaped blades 37 extending radially outwards from the periphery thereof, the radially outer leading edges 38 thereof subdividing the flow of air coming from the inlet tube 23 into streams of air flowing between the blades 37 and being exhausted parallel to the axis Y from the outlet of the blades 37.

In a first variant of the first embodiment of the invention, as shown in FIG. 5, the passages for the streams of air through the blades 37 are defined on the outside by a wall 40 secured to the blades 37 and having an aerodynamic profile. This wall 40 is extended in the air flow direction by a cylindrical sleeve 41 of axis Y with the rotor 42 of the electric motor 21 mounted thereabout, the stator 43 of said electric motor being mounted in a bore 44 formed in the casing 35 in register with the cylindrical sleeve 41. The electric motor 21 does not have any bearings of its own. In this variant embodiment, the shaft 31 and the wheel 36 comprise a single piece.

In a second variant of the first embodiment of the invention, shown in FIG. 6, the end of the shaft 31 that is remote from the gear pump 13 is engaged in a bore of the bladed wheel 36. At its radially outer end, this wheel 36 presents a cylindrical sleeve 41 of axis Y which extends axially in the opposite direction to the air flow direction at the outlet from the blades 37, in line with the leading edges 38 of the blades 37. The cylindrical sleeve 41 is placed in a cylindrical housing 45 arranged in the casing 35 around the support 46 for the bearings 33a and 33b and open axially beside the wheel 36.

The rotor 42 of the electric motor 21 is mounted inside the cylindrical sleeve 41 and surrounds the stator 42 of the electric motor, which is itself mounted in the cylindrical housing 45 around the support 46 for the bearings 33a and 33b.

In FIGS. 5 and 6, reference 47 designates a spacer disposed between the bearings 33a and 33b. These bearings 33a and 33b are held on the shaft 30 in conventional manner by shoulders and by resilient rings co-operating with grooves.

Figures 7, 8:
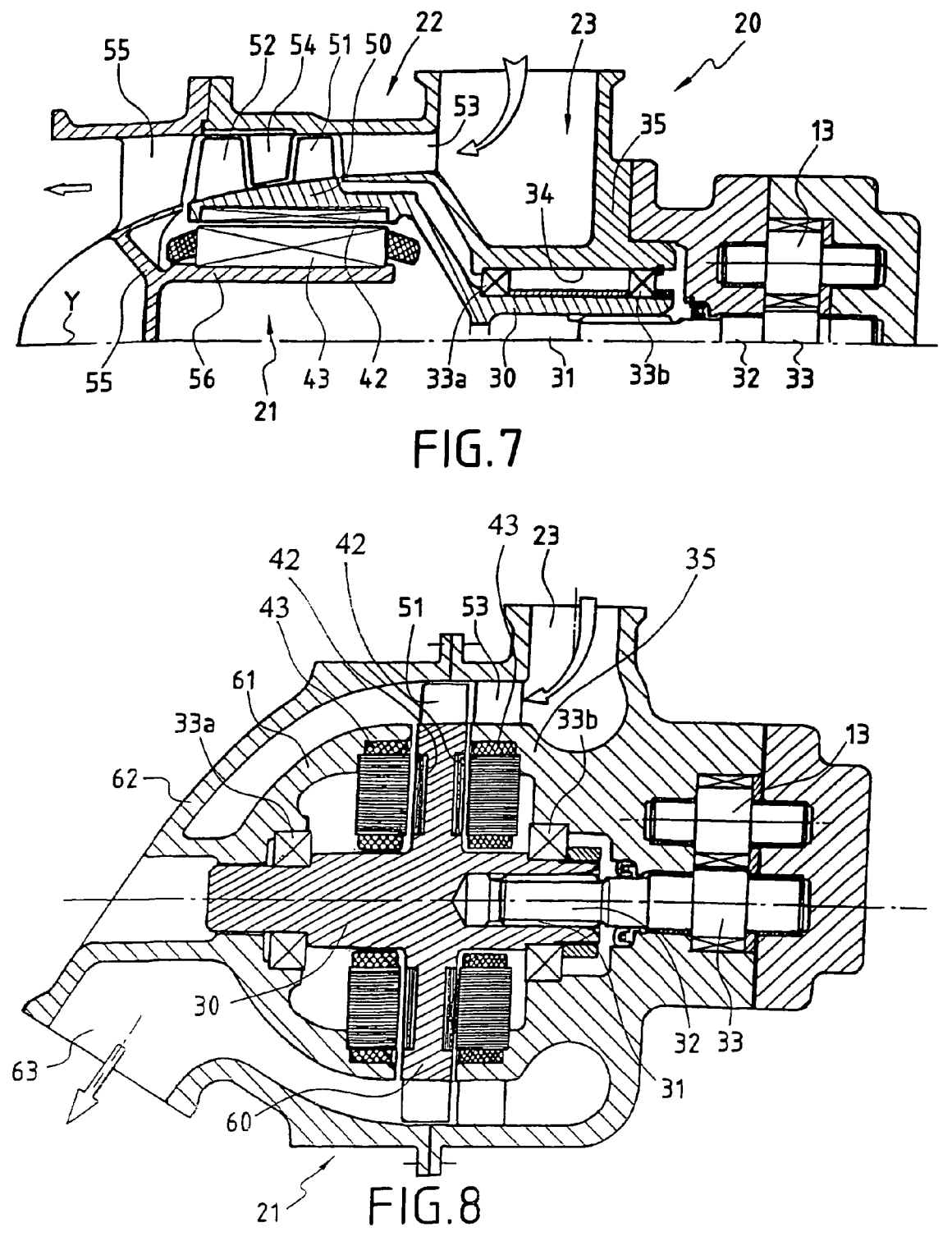

FIG. 7 shows a second embodiment of the drive system 20 for a gear pump 13. The air turbine 22 in this case is of the axial type comprising a drum 50 provided at the free end of a shaft 30 supported by two bearings 33a and 33b in the bore 34 of the casing 35 of the air turbine 22. The shaft 30 also has a bore 31 for coupling with the drive shaft 32 of a gearwheel 33 of the gear pump 13. At its periphery, the drum 50 has two rings of moving blades 51 and 52 which extend radially outwards. The portion of the casing 35 which surrounds the drum 50 presents a first ring of stationary blades 53 or "nozzles" between the inlet tube 23 and the ring of moving blades 51, a second ring of stationary blades 54 extending radially inwards between the ring of moving blades 51 and the ring of moving blades 52, and a plurality of structural arms 55 which extend radially inwards downstream from the second ring of moving blades 52 and connect the outer casing 35 to an internal structure 55 from which a cylindrical sleeve 56 extends axially inside the drum 50. The stator 43 of the electric motor 21 is mounted around the cylindrical sleeve 56, and the rotor 42 is mounted in the bore inside the drum 50.

Figure 9:
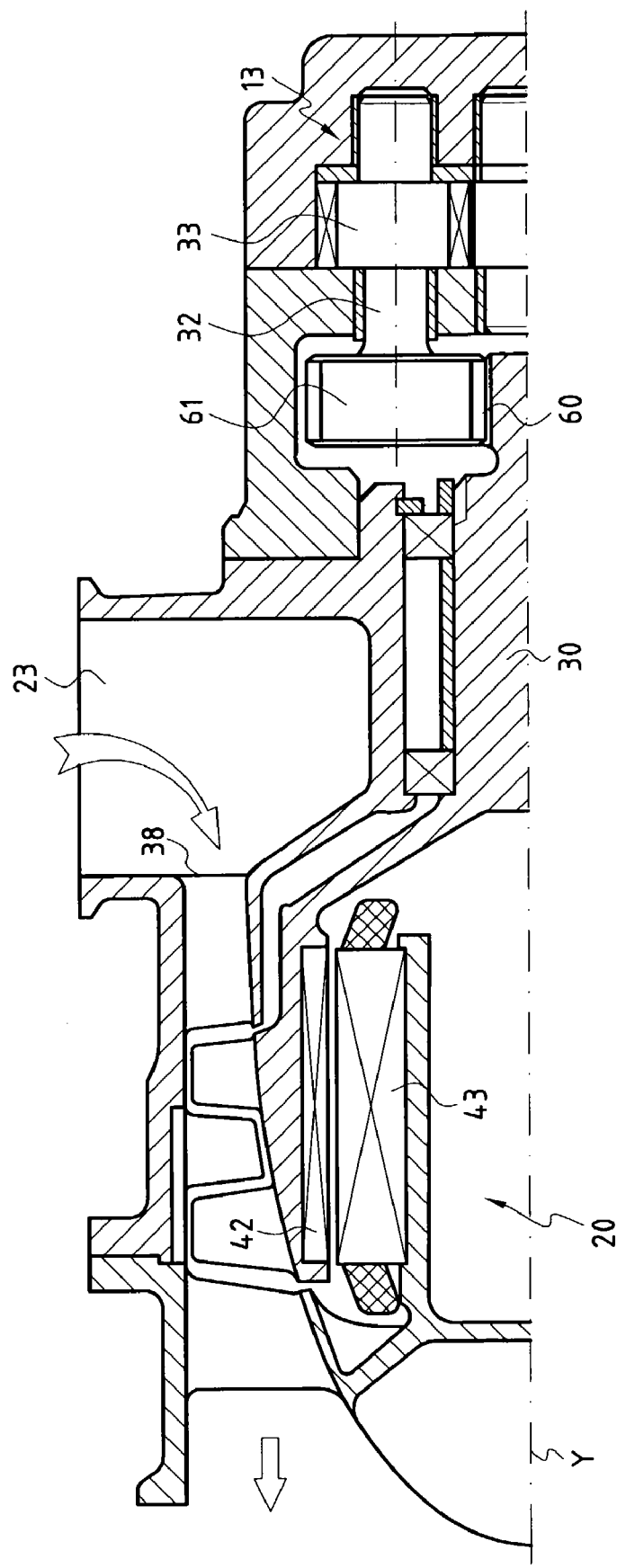
FIG. 9 is similar to FIG. 6 and shows a stepdown gearbox disposed between the drive shaft of the drive system and the shaft of the fuel pump.

FIG. 9 shows a drive system 20 similar to that described above. The only difference lies in the fact that the shaft 30 of the air turbine is solid and presents at its periphery a set of teeth 60 which mesh with a gearwheel 61 secured to the drive shaft 32 of one of the gears 33 of the gear pump 13. The set of teeth 60 and the gearwheel 61 act as a gearbox for reducing speed.

FIG. 8 shows a third embodiment of the invention. The air turbine 21 is of the single-stage axial type and comprises a stationary ring of nozzle blades 53 downstream from the tube 23 in the direction air flows through the air turbine 21. A ring of moving blades 51 is disposed downstream from the ring of nozzle blades 53. The moving blades 51 extend radially outwards from the periphery of a solid wheel 60 which extends radially outwards from the middle zone of a shaft 30 supported at each end by a bearing 33a, 33b. The end of the shaft 30 situated beside the tube 23 has a fluted bore 31 for coupling with the drive shaft 32 of the gearing 33,of the gear pump 13.

Downstream from the ring of moving blades 51 the air flow stream is defined by two shrouds 61, 62 forming a structure for supporting the bearing 33a. An air exhaust opening 63 is provided in the outer shroud 62.

Each of the radial faces of the wheel 60 has an annular housing in which a rotor 42 of a radial airgap electric motor is mounted, the stator 43 of this motor being mounted in a bore of the casing 35 or of the shroud 61.

The drive system 20 of this third embodiment thus has two electric motors disposed on either side of the radial midplane of the wheel 60.

In all three above-described embodiments, the electric motor 21 is integrated inside the air turbine 22 and there are no bearings specific to the electric motor between the rotor 42 and the stator 43, the bearings 33a and 33b serving to center the rotary element of the air turbine 22 relative to the casing 35, and simultaneously acting to center the rotor 42 relative to the stator 43. The drive system 20 of the gear pump 13 is thus compact, reliable, and lightweight.

The electric drive motor is of conventional type, being brushless, asynchronous, with permanent magnets or of variable reluctance, for example.

It should be observed that the gear pump 13 could be associated with a drive system 20 so as to constitute a complete module that is ready for mounting and easy to replace.

What is claimed is:

1. A system for driving a pump in a turboengine, said system comprising:
an electric motor including a stator and a rotor, and;
an air turbine including a casing and a rotary assembly;
said air turbine being suitable for being fed by a flow of air taken from a compressor of said turboengine in order to contribute to driving said pump,
wherein the air turbine lies on a same axis as said electric motor, and
wherein the stator of said electric motor is integrated in the casing of said air turbine, and the rotor of said electric motor is integrated in the rotary assembly of the air turbine.

2. A system according to claim 1, further comprising a control valve for controlling the flow of air taken from the compressor, which control valve is in a closed position while the turboengine is starting and in an open position once said turboengine has started.

3. A system according to claim 1, wherein the flow of air taken from the compressor is sufficient to enable the pump to be operated by the air turbine in the absence of electrical power supply or in the event of said electric motor failing.

4. A system according to claim 1, wherein the rotor of the electric motor is mounted on a wall of the rotary assembly, and the stator is mounted on a wall of the casing.

5. A system according to claim 4, wherein the rotary assembly includes a shaft mechanically coupled to the pump and supported by bearings interposed between said shaft and the casing.

6. A system according to claim 5, wherein the air turbine is an axial-centripetal air turbine, and the rotary assembly includes a wheel at a free end of the shaft, axial-centripetal blades extending from the periphery of the wheel.

7. A system according to claim 6, wherein air stream passages between the blades are outwardly defined by a wall secured to ends of the blades and axially extended in an air flow direction by a cylindrical sleeve around which the rotor of the electric motor is mounted.

8. A system according to claim 6, wherein the wheel includes a cylindrical sleeve at radially outer ends of the blades, which sleeve extends axially in a direction opposite to an air flow direction, and is disposed in an axial housing formed in the casing around the bearings, and the rotor of the electric motor is mounted inside said sleeve.

9. A system according to claim 5, wherein the air turbine is an axial air turbine and comprises at least one ring of stationary blades extending radially inwards from the casing, and a ring of moving blades extending radially outwards from a drum secured to the shaft, the rotor of the electric motor being mounted inside said drum and the stator being mounted around a cylindrical sleeve connected to the casing by structural arms.

10. A system according to claim 5, wherein the air turbine is an axial air turbine and has a ring of nozzle blades and a ring of moving blades provided at the periphery of a wheel which extends radially from a middle zone of the shaft, said shaft being supported at each of its ends by a respective bearing, an air flow stream being defined downstream from the ring of moving blades by two shrouds forming a support structure for one of the bearings, and the rotor of the electric motor is mounted on a face of said wheel, an airgap of said electric motor lying in a radial plane.

11. A system according to claim 10, comprising a second electric motor with a rotor mounted on another face of the wheel.

12. A system according to claim 1, wherein the turboengine is an "all-electric" aeroengine.

13. A system according to claim 1, wherein the pump is a gear pump and together with said system constitutes a complete module that is ready for mounting and easy to replace.

14. A system according to claim 1, wherein the pump is a gear pump.

15. A system according to claim 1, wherein the pump is a fuel pump.

16. A system according to claim 1, wherein the pump is an oil pump.

17. A system according to claim 1, further comprising said turboengine with said compressor and said pump.

18. A system according to claim 17, wherein said electric motor is configured to drive said pump.

19. A system for driving a pump in a turboengine, said system comprising:
    a turboengine with a compressor and a pump;
    an electric motor including a stator and a rotor, wherein said electric motor is configured to drive said pump, and;
    an air turbine including a casing and a rotary assembly; said air turbine being configured to receive a flow of air from said compressor of said turboengine and being configured to contribute to driving said pump, and
    wherein the stator of said electric motor is located in the casing of said air turbine,
    wherein the rotor of said electric motor is located in the rotary assembly of said air turbine.

20. A system according to claim 19, wherein the air turbine lies on a same axis as said electric motor.

21. A system according to claim 19, further comprising a control valve configured to control the flow of air from the compressor, said control valve being in a closed position when the turboengine is starting and in an open position after said turboengine has started.

* * * * *